United States Patent
Midavaine

(10) Patent No.: US 9,712,762 B2
(45) Date of Patent: Jul. 18, 2017

(54) METHOD OF IMAGING A TARGET IN A NIGHT SKY

(71) Applicant: THALES, Courbevoie (FR)

(72) Inventor: Thierry Midavaine, Elancourt (FR)

(73) Assignee: THALES, Courbevoie (FR)

( * ) Notice: Subject to any disclaimer, the term of this patent is extended or adjusted under 35 U.S.C. 154(b) by 200 days.

(21) Appl. No.: 14/654,266

(22) PCT Filed: Dec. 17, 2013

(86) PCT No.: PCT/EP2013/076853
§ 371 (c)(1),
(2) Date: Jun. 19, 2015

(87) PCT Pub. No.: WO2014/095825
PCT Pub. Date: Jun. 26, 2014

(65) Prior Publication Data
US 2015/0350568 A1    Dec. 3, 2015

(30) Foreign Application Priority Data

Dec. 21, 2012  (FR) ...................... 12 03557

(51) Int. Cl.
*H04N 5/33*       (2006.01)
*H04N 9/04*       (2006.01)
*H04N 5/247*      (2006.01)

(52) U.S. Cl.
CPC .............. *H04N 5/33* (2013.01); *H04N 5/247* (2013.01); *H04N 9/045* (2013.01)

(58) Field of Classification Search
None
See application file for complete search history.

(56) References Cited

U.S. PATENT DOCUMENTS 8,326,142 B2 * 12/2012 Kravitz .................. G03B 17/02
                                                    348/164

FOREIGN PATENT DOCUMENTS

WO      2008/131313 A2   10/2008

OTHER PUBLICATIONS

Wikipedia the free encyclopedia, "Counter-illumination," Mar. 26, 2013, retrieved Jan. 28, 2014, XP055098794 <http://en.wikipedia.org/wiki/Counter-illumination>.

* cited by examiner

*Primary Examiner* — Tony Ko
(74) *Attorney, Agent, or Firm* — Baker & Hostetler LLP

(57) ABSTRACT

A method is provided for detecting a target not emitting in the wavelength region lying between 1 μm and 1.9 μm. The target is situated in a night sky luminous environment of level less than or equal to 4. Use is made of an imaging device of focal length f and of pupil diameter D, comprising at least one detector comprising types of pixels configured to operate in the wavelength region lying between 1 μm and 1.9 μm, the detectors exhibiting a noise level of less than $0.6 \times 10^{15}/(f/D)^2$, and from the image obtained by this device is extracted at least one negative-contrast zone, that is to say a black zone on a bright background corresponding to the presence of the target in the night sky of level less than or equal to 4.

4 Claims, 4 Drawing Sheets

METHOD OF IMAGING A TARGET IN A NIGHT SKY

CROSS-REFERENCE TO RELATED APPLICATIONS

This application is a National Stage of International patent application PCT/EP2013/076853, filed on Dec. 17, 2013, which claims priority to foreign French patent application No. FR 1203557, filed on Dec. 21, 2012, the disclosures of which are incorporated by reference in their entirety.

FIELD OF THE INVENTION

The invention relates to the field of ground-air or air-air observation. The invention relates to an imaging device and more precisely an imaging device for an aerial target in a night sky.

BACKGROUND

"Night sky" is intended to mean a part of space visible above the horizon from an arbitrary point of the Earth or from the air and which no longer receives sunlight on account of its position with respect to the Sun.

Generally, a device for detection or imaging of an aerial target in a night sky comprises a thermal infrared camera.

The infrared camera makes it possible to highlight multiple phenomena by picturing as an image the value of the temperatures of the observed objects or their signature associated with infrared emission lines.

The infrared camera senses through the atmosphere radiation emitted by the objects. A radiometric system converts the radiation power into digital or analog signals. The latter are optionally transcribed into illuminations, luminances or else into temperatures by a computer and transformed into luminous points on a screen. The infrared camera uses one or more spectral bands corresponding to the infrared and more particularly a first spectral band extending over a range of wavelengths lying between 3 and 5.5 micrometers called the IR2 band or "Mid Wavelength InfraRed" or MWIR region, or a second spectral band extending over a range of wavelengths lying between 8 and 12 micrometers called the IR3 band or "Long Wavelength InfraRed" or LWIR region.

Thermal cameras are used in numerous applications such as the detection of weak points of the insulation of a building or the detection of victims during fires. Infrared cameras are also used during nighttime military operations for the detection, recognition and identification of targets, notably.

The image of an aerial target in a night sky obtained with the aid of an infrared camera comprises the target but also hot combustion gases issuing from the propulsion units of the target and called "propulsion plumes". The combustion gases comprise a significant proportion of carbon dioxide exhibiting a very strong emission band in an MWIR region and more particularly a wavelength band centered on 4.2 micrometers. The presence of carbon dioxide at high temperature renders a target's combustion gases visible on an image obtained with the aid of an infrared camera operating in band 2 or MWIR.

The image obtained can be delivered in black and white with a gray level proportional to the illumination of the source if it is not resolved or to its luminance if it is angularly resolved. Another way of delivering these images can be achieved by a color coding.

This IR2 band of the MWIR is therefore well suited to carrying out the detection of flying targets at long range. On the other hand, depending on the orientation of the target with respect to the infrared camera, the identification of the target may turn out to be difficult because of the presence of these propulsion plumes which may mask the real contours of the target. Indeed, the strength of the emissions of the signature of the target itself is often much lower than the strength of the emissions of the propulsion plumes.

SUMMARY OF THE INVENTION

In this context, there is proposed a night sky aerial target imaging device making it possible notably to alleviate this drawback.

The proposed device utilizes the luminescence of the night sky, called the "night glow".

The luminescence of the night sky or "night glow" is defined as being a weak extended source of light caused by a luminous layer about 10 km in thickness situated in the upper atmosphere at an altitude of between 80 and 100 km. This nighttime luminance is generated by atoms and/or molecules comprising notably hydroxide groups OH present in the composition of this luminous layer and which exhibit emission bands in the Near InfraRed (NIR) region and especially in the IR1 or "Short Wavelength InfraRed" (SWIR) band lying between 1 and 3 micrometers, this weak light constituting a luminous sky background in this wavelength region.

According to one aspect of the invention, there is proposed a method for detecting a target not emitting in the wavelength region $\Delta\lambda 1$ lying between 1 µm and 1.9 µm. It is mainly characterized in that the target being in a night sky luminous environment of level less than or equal to 4:

use is made of an imaging device of focal length f and of pupil diameter D, comprising at least one detector (5, 11) comprising types of pixels (51, 111) configured to operate in the wavelength region lying between 1 µm and 1.9 µm, the detectors (5, 11) exhibiting a noise level of less than $0.6 \times 10^{15}/(f/D)^2$, and from the image obtained by this device is extracted at least one negative-contrast zone, that is to say a black zone on a bright background corresponding to the presence of the target in the night sky of level less than or equal to 4.

The target is typically an opaque aircraft part not emitting in the wavelength region lying between 1 µm and 1.9 µm. The imaging device thus used makes it possible to obtain the image of the aerial target detected, in opaque silhouette, on a luminous background, the image not exhibiting the propulsion plumes. This high-resolution image of the contours of the target makes it possible to carry out its recognition and its identification.

The imaging device is advantageously installed aboard an aircraft in flight with a pupil diameter D lying between 30 mm and 300 mm and a focal length f lying between 300 mm and 3000 mm, and with a field of view <10°, for an air-air application.

The imaging device can be installed on the ground, with a pupil diameter D lying between 10 mm and 100 mm, a focal length f lying between 30 mm and 300 mm and with a field of view >10° for a ground-air application.

Advantageously, the imaging device furthermore comprises image acquisition and processing means connected to the detectors. The image acquisition and processing means can be dissociated from the imaging device. The image acquisition and processing means make it possible to carry out algorithmic operations in order to improve the signalto-noise ratio and so as to allow additional processing operations or a transmission of the signal.

The imaging device comprises a first objective whose focal length varies between 30 mm and 3000 mm and at least one detector comprising at least one second type of pixel configured to operate in a second wavelength region, the second wavelength region Δλ2 corresponding to the MWIR region between 3 and 5 μm.

The use of detectors operating over the MWIR region furthermore allows an image to be obtained making it possible to view the propulsion plumes of the aerial target thereby facilitating detection of the aerial target.

Optionally, at least one detector comprises a third type of pixel configured to operate in a third wavelength region, the third wavelength region Δλ3 corresponding to the near UV and blue region.

Such a device will afford a complementary capacity for recognition and identification of targets in particular by day.

The association of a detection in the Δλ2 region of the MWIR and of a detection in the Δλ3 region of the blue or of the near UV is described in patent application FR 1004934.

In another embodiment, the imaging device furthermore comprises a second camera comprising a second objective of second pupil diameter lying between 10 mm and 100 mm and of second focal length lying between 30 mm and 300 mm, and at least one detector operating in the Δλ2 region of the MWIR between 3 and 5 μm.

Advantageously, the imaging device such as described previously furthermore comprises a device for orienting a sighting line of the objective allowing notably a monitoring of the airspace in a very large angular region.

Advantageously, an aircraft comprises an imaging device such as described previously for an air-air application.

Advantageously, a ground craft comprises an imaging device such as described previously for a ground-air application.

BRIEF DESCRIPTION OF THE DRAWINGS

The invention will be better understood on studying a few embodiments described by way of wholly non-limiting examples, and illustrated by appended drawings in which.

DETAILED DESCRIPTION

Figure 1:
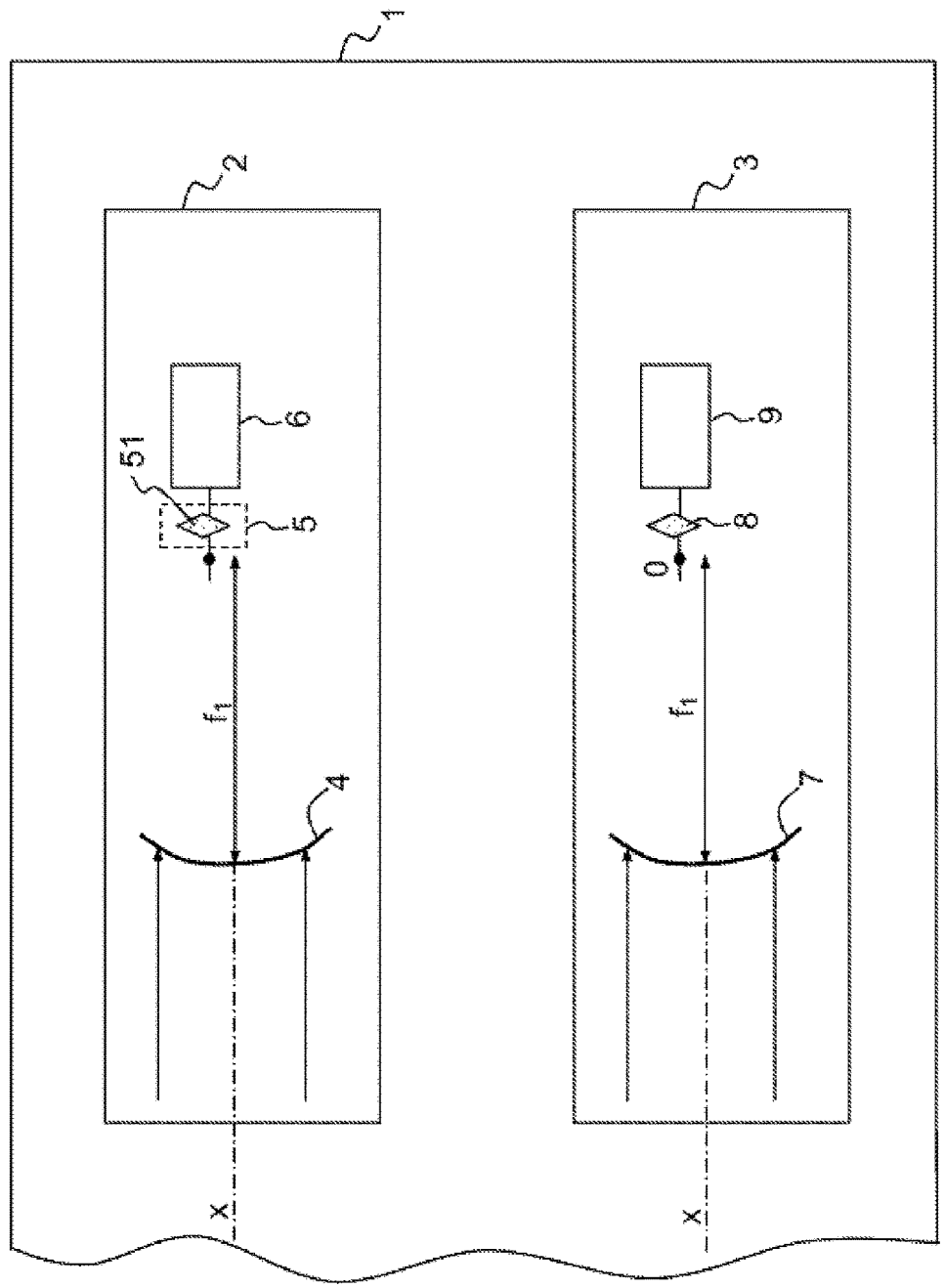
FIG. 1 illustrates an embodiment of the imaging device, according to one aspect of the invention.

FIG. 1 presents an embodiment of an imaging device.

The imaging device 1 comprises a first camera 2 and optionally a second camera 3.

The first camera 2 comprises a first objective 4 comprising a pupil of diameter lying between 30 mm and 300 mm and having a first focal length f1 lying between 300 mm and 3000 mm. The dimensioning of the first objective 3 makes it possible to achieve a first camera with small field.

Figure 3:
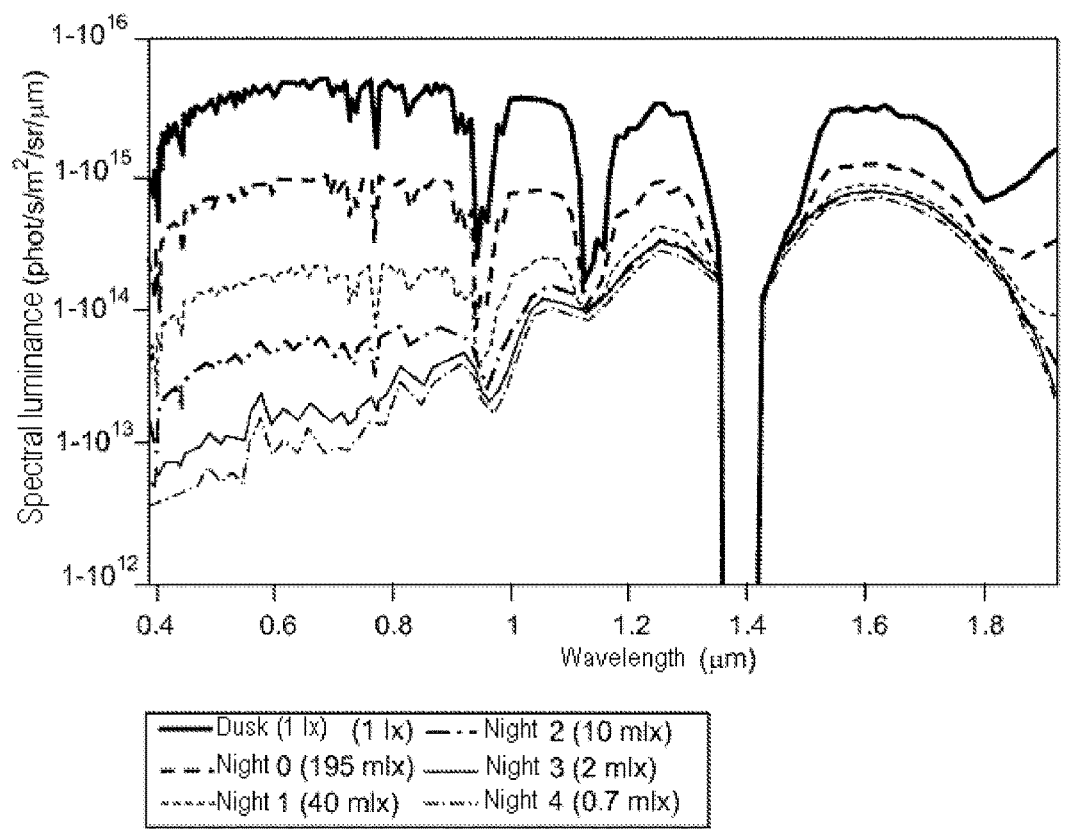
FIG. 3 is a graphical representation of the luminance of a night sky as a function of wavelength for the limits of the various night levels which correspond to the various lunar phases, to the various cloud covers and for a dusk sky.

A detector 5 is situated substantially in the focal plane of the first objective 4. The detector 5 can comprise a matrix array of pixels configured to operate in a first wavelength region Δλ1, the first wavelength region Δλ1 centered on the value of the wavelengths of maximum luminance for a night sky with no Moon (curves of the limits of night 3 at 2 mlx and night 4 at 0.7 mlx). As shown by FIG. 3, this wavelength region Δλ1 is situated in the IR1 (or SWIR) band around 1.6 μm and extending for example over a wavelength region of width less than 1 μm.

As shown by FIG. 3, the maximum luminance value as well as the corresponding wavelength is substantially identical for all the lunar phases. The wavelength corresponding to the maximum luminance value for all the lunar phases is substantially equal to 1.64 μm.

The detector 5 makes it possible to utilize the luminescence of a night sky for better viewing of aerial targets. To utilize the luminescence of the night sky, it is indispensable that the noise level of the detector 5 be less than the signal equivalent to the luminance of the night sky over the first wavelength region. For example, for an integration time of 40 ms, and for a signal-to-noise ratio of greater than 2.25, the noise level must be of the order of or less than 10 electrons RMS. The detector 5 is connected to means for acquiring images 6 making it possible to improve the quality of the images and/or to format them to allow the transmission of the signal to a device disposed downstream.

Advantageously, the detector 5 is a photodetector comprising a structure of InGaAs type or of HgCdTe type. Alternatively, the detector 5 can be a photodiode or a photoemissive material like a photocathode.

Technological progress with detectors may also make it possible to envisage employing the IR1 or SWIR band up to 3 μm of wavelength, a region where the targets remain dark, the nighttime sky background still luminous through the effect of the night glow, and where the atmosphere is transparent.

The second camera 3 comprises a second objective 7 comprising a pupil of diameter lying between 10 mm and 100 mm and having a second focal length f2 lying between 30 mm and 300 mm. The dimensioning of the second objective 7 makes it possible to achieve a second camera with large field.

A second detector 8 is situated substantially in the focal plane of the second objective 7. The detector 8 can comprise a matrix array of pixels configured to operate in a second wavelength region Δλ2 corresponding to the MWIR region. The second detector 8 is connected to means for acquiring images 9 making it possible to improve the quality of the images and/or to format them to allow the transmission of the signal to a device disposed downstream.

Other cameras having detectors operating in other wavelength regions may be associated with the imaging device such as described previously.

For example, the first camera 2 comprises an objective 4 comprising a 60 mm pupil and defining a first focal length f1 of 500 mm; the detector 5 comprises pixels 51 of square geometry of 15 micrometers by 15 micrometers, the pixel spacing, defining the gap between two consecutive pixels of a row or column, being 15 micrometers suited to the diffraction spot. The pixel spacing makes it possible to define an elementary measurement angular field of view, or Instantaneous Field of View (IFOV), of 30 µrd. Stated otherwise, the resolution of this first camera 2 makes it possible to record the image of a target with a pixel spacing representing 3 m to 100 km. This resolution is well suited to detection, to recognition and for shorter distances to aircraft identification.

Figure 2:
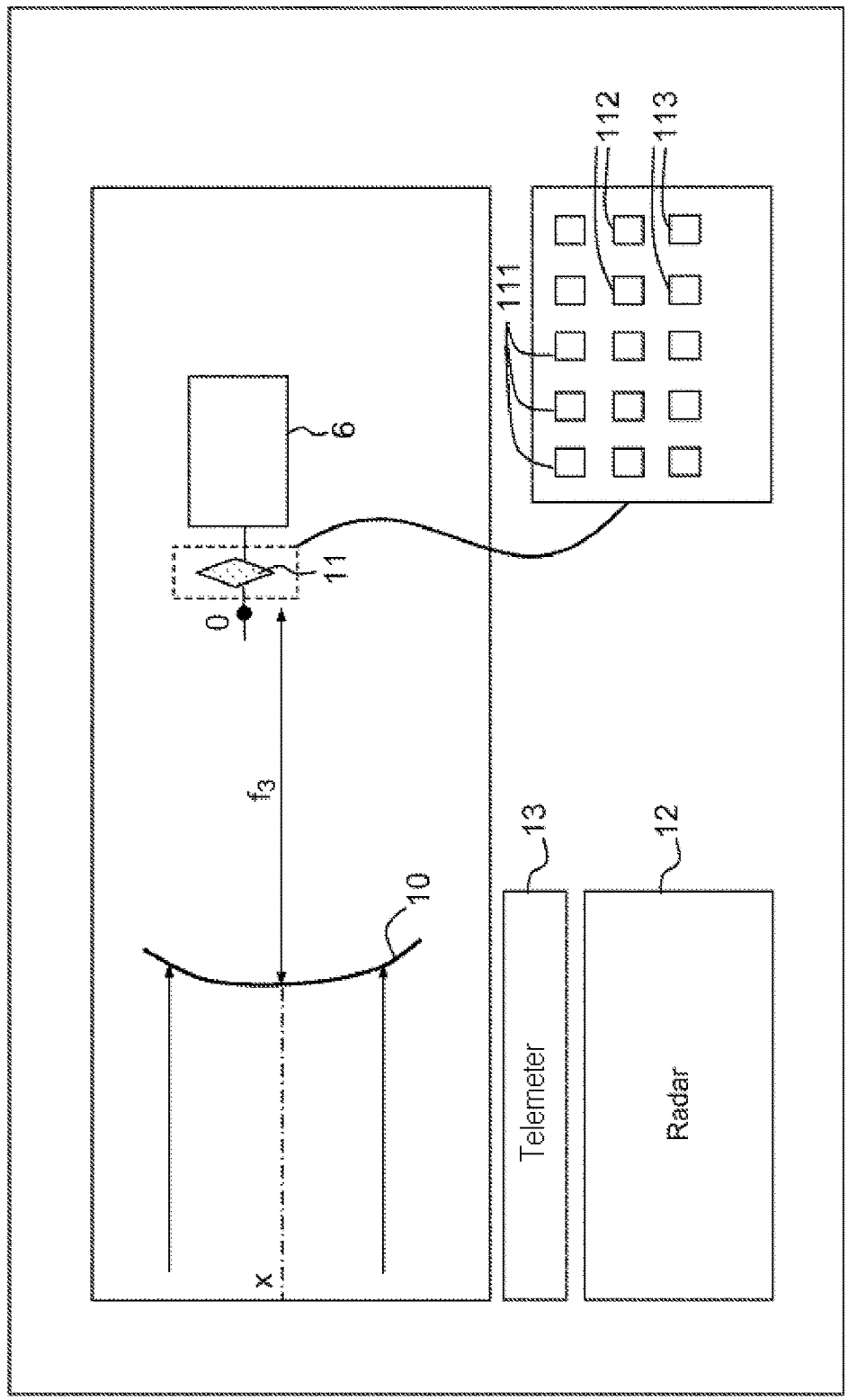
FIG. 2 illustrates another embodiment of the imaging device, according to one aspect of the invention.

FIG. 2 illustrates a schematic representation of the imaging device according to another aspect of the invention.

The imaging device 1 comprises a variable focal length objective 10, a detector 11 and acquisition means 4. The variable focal length objective 10 defining an optical axis Ox comprises an optic that can comprise one or more lenses. Advantageously, the focal length f3 of the objective 10 varies between 30 mm and 3000 mm.

The detector 11 is situated substantially in the focal plane defined by the objective 11. The detector 11 is an element making it possible to translate the luminous flux into an electrical signal generated by a photocurrent or by an accumulation of photocharges over a finite time.

Advantageously, the detector 11 is a photodetector of HgCdTe or InSb type or else of super array type.

The detector 11 comprises pixels arranged in matrix form. The detector 11 comprises at least one first pixel 111 configured to operate in the first wavelength region $\Delta\lambda 1$.

Advantageously, the first wavelength region $\Delta\lambda 1$ belongs to the SWIR region corresponding to a wavelength region lying between 1 and 3 micrometers.

The detector 11 furthermore comprises at least one second pixel 112 configured to operate in a second wavelength region $\Delta\lambda 2$ corresponding to the MWIR region corresponding to a wavelength region lying between 3 and 5 µm. Or else on account of the signatures of the targets it may be advantageous to choose this spectral region in the LWIR region IR3 band, between 8 and 12 micrometers. Optionally, the detector 11 furthermore comprises at least one third pixel 113 configured to operate in a third wavelength region $\Delta\lambda 3$ corresponding to the blue region, about 470 nanometers, and the near UV region between 200 and 400 nanometers.

According to one embodiment, represented in FIG. 2, the detector 11 comprises pixels 111, 112, 113 arranged in a linear manner. For example, the detector 11 comprises a first row of first pixels 111, a second row of second pixels 112 and a third row of third pixels 113.

In another embodiment, not represented, the detector 11 comprises three sub-detectors 11a, 11b and 11c each comprising a set of pixels 111, 112, 113 configured to operate in the first $\Delta\lambda 1$, the second $\Delta\lambda 2$ and the third $\Delta\lambda 3$ wavelength regions, respectively. The three sub-detectors 11a, 11b and 11c are mounted on an optical device composed of dichroic splitter plates or of prisms making it possible to dispose the three sub-detectors substantially in the three focal planes so as to achieve an image in the three wavelength regions $\Delta\lambda 1$, $\Delta\lambda 2$, $\Delta\lambda 3$ simultaneously.

The detectors 11 are connected to acquisition means 6.

Optionally, the imaging device 1 is associated with a radar 12 allowing the detection and the designation of aerial targets to be imaged.

In another embodiment of the invention, the imaging device is associated with a telemeter 13 making it possible to determine the distance between the target and the imaging device 1.

FIG. 3 is a graphical representation of the photonic spectral luminance of the sky for various luminous illuminations or night levels that can correspond to various lunar phases or cloud covers. The wavelength region studied lies between 0.4 and 2 µm. This region is bounded in the short wavelengths by the atmospheric absorption which is rapidly increasing in the near UV between 0.4 µm and 0.3 µm and in the large wavelengths by the thermal radiation of the atmosphere which becomes rapidly dominant onwards of 3 µm.

The evolution of the curves representative of the spectral photonic luminance of the sky at dusk or of a night sky whatever the phase of the Moon is similar. The curves exhibit a first interval of wavelengths lying between 0.4 and 1.35 µm, a second interval lying between 1.45 µm and 1.9 µm. The whole of this region is marked by atmospheric absorption lines or bands with at 0.8 µm a line caused by $O_2$, and between 0.9 and 1.2 µm absorption lines caused by $H_2O$ and between 1.35 and 1.45 µm a very strong absorption band caused by $H_2O$ and $CO_2$ (water vapor and carbon dioxide) as well as between 1.8 µm and 2 µm also caused by $H_2O$ and $CO_2$.

Over the first interval of wavelengths between 0.4 and 1.35 µm, the luminance of a sky at dusk is substantially greater than $10^{15}$ phot/s/m²/sr/µm and relatively flat outside of the atmospheric absorption lines and bands seen above and exhibits a maximum centered on a wavelength of 0.7 µm.

Over the second interval of wavelengths between 1.45 µm and 1.9 µm, the luminance of a dusk sky fluctuates around a value greater than $10^{15}$ phot/s/m²/sr/µm.

Over the first interval of wavelengths, the luminance of a night sky with full Moon, corresponding to the Night 0 curve, is relatively flat (outside of the atmospheric absorption lines and bands seen above) and close to $10^{15}$ phot/s/m²/sr/µm. Over the second interval of wavelengths, the luminance of a full Moon sky is also close to $10^{15}$ phots/m²/sr/µm. The second interval of the luminance curve of a sky at dusk and the second interval of a night sky for a night with full Moon are close and are superposed.

For the limits of the other night levels 1, 2, 3 and 4, the spectral luminances of the sky decrease with the night level with levels of close to $10^{14}$ phot/s/m²/sr/µm for a night level 1 and close to $10^{13}$ phot/s/m²/sr/µm for a night level 4 in the visible region between 0.4 and 0.8 µm. For all these night levels, the luminance of the sky background will increase with wavelength. In the second interval between 1.45 µm and 1.9 µm, the luminance of the sky background becomes rather insensitive to the night level as shown by the superposition of the curves close to a value of $10^{15}$ phot/s/m²/sr/µm.

Figure 4:
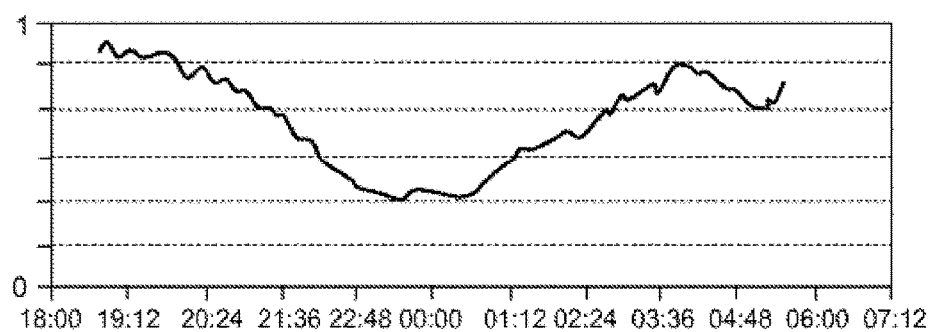
FIG. 4 is a graphical representation of the luminance of a part of the night sky as a function of time.

FIG. 4 is a graphical representation of the relative luminance of a portion of the night sky as a function of the hour during the night.

In this instance, the relative luminance of the portion of sky observed at 18 h is close to 1 whereas at midnight the relative luminance is near 0.4. A relative variation of the luminance is thus observed during the night by a factor of 2 to 3 for a given observation zone; these observed variations are random.

These temporal variations of the luminance of the night sky are essentially due to variations in the physico-chemical processes implemented in the upper atmosphere and responsible for this nighttime luminescence. For similar reasons, geographical variations in the luminance of a night sky may be observed.

To summarize, the luminance of the night sky is inhomogeneous temporally and also geographically; it varies by of the order of a factor of 2 to 3 spatially and geometrically. It is worth noting that this phenomenon is always present and is never zero in contradistinction to the aurora borealis phenomena which vary according to solar activity and are observed in a ring of variable diameter, centered in the vicinity of the magnetic poles.

The table hereinbelow recalls the various night levels as defined in the RE.Aero 790 40 standard.

| Night level | Definition of night | Illumination in mix | Astronomical and meteorological situation | | Observations |
|---|---|---|---|---|---|
| | | | Natural illumination (shape of the moon) | Cloud cover | |
| 1 | very light | greater than 40 | from 1/1 to 3/4 | less than 1/2 | MOON: 1/1 - full moon |
| | | | 1/2 | 0 | 3/4 - 3/4 moon |
| 2 | light | from 40 to 10 | from 1/1 to 3/4 | from 1/2 to 3/4 | 1/2 - 1/2 moon |
| | | | 1/2 | less than 1/2 | 1/4 - 1st or last quarter |
| | | | 1/4 | 0 | 0 - no moon |
| 3 | intermediate | from 10 to 2 | from 1/1 to 3/4 | greater than 3/4 | CLOUDS: |
| | | | 1/2 | from 1/2 to 2/4 | greater than 3/4: |
| | | | 1/4 | less than 1/2 | very heavy cloud cover |
| 4 | dark | from 2 to 0.7 | 1/2 | greater than 3/4 | between 1/2 and 3/4: |
| | | | 1/4 | from 1/2 to 3/4 | heavy cloud cover |
| | | | 0 | less than 1/2 | less than 1/2: |
| 5 | very dark | from 0.7 to 0.1 | 1/4 | greater than 3/4 | medium cloud cover |
| | | | 0 | greater than 1/2 | 0: no cloud (starry blue sky) |

NOTE:
0.1 mix is the weakest detectable illumination

The order of magnitude of the luminance of the night sky leads to a photon flux of 1000 photons per second per pixel, for a pixel size suited to the diffraction limit having regard to the numerical aperture of the optic. Thus, for an imaging device 1 operating with a frequency of 50 Hz, a pixel receives 20 photons per frame.

According to the invention, these luminance properties of the sky are used to detect an aerial target in the following manner. According to customary use, the IR imaging device is used to form an image on the basis of the IR emission of the aerial target, in this instance its plumes of the propulsion combustion gases in the IR2 or MWIR band or its thermal signature on account of the kinetic heating of its surface in the IR2 or MWIR band or in the IR3 or LWIR band. On the contrary, according to the invention this imaging device is used to form the image obtained without IR emission of the target. The propulsion plumes do not appear on the image obtained; it is the non-emissive parts in this IR1 wavelength region (1 µm-1.9 µm) that appear. The image which is that of the silhouette of the aerial target is obtained as a cast shadow; it is its specific luminous environment (level 4 night sky) which is emissive in this wavelength region.

The image obtained is then processed to extract therefrom this (or these) silhouette(s) for analysis and identification purposes. This extraction can be carried out by an observer or automatically. In a conventional manner it is possible to use as method of automatic extraction of the target an algorithm for analyzing the luminance of the background and its spatio temporal fluctuations which determines an adaptive threshold. If the signal passes under this threshold then there is detection of a target in negative contrast. The high angular resolution image analysis (for example by accumulation processing with resetting or by so-called super resolution processing) in the vicinity of the detection makes it possible to deliver an image of the silhouette of the target. The analysis of this silhouette optionally associated with the measurement of distance and with banks of reference images makes it possible to carry out a classification of the target, its recognition and its identification.

Figure 5:
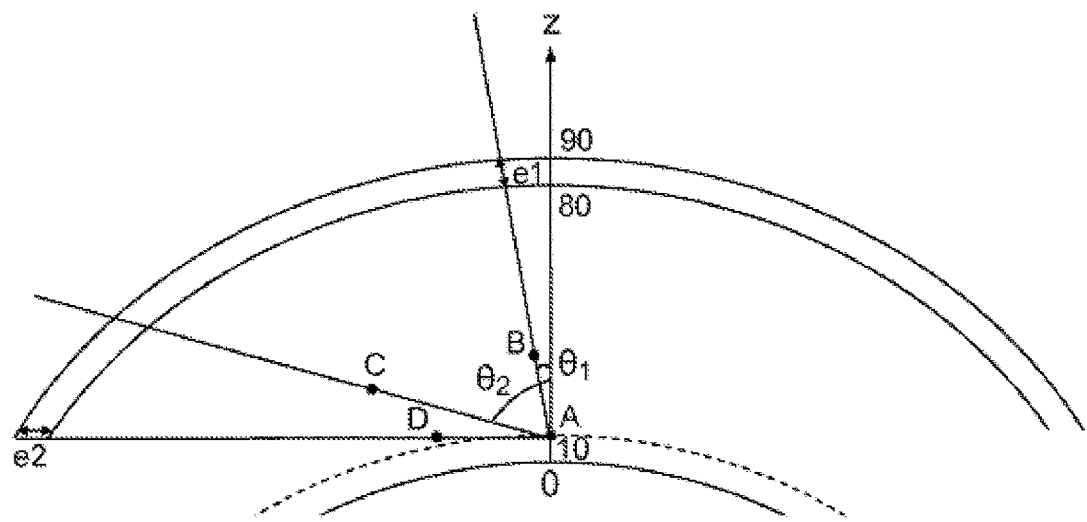
FIG. 5 represents the various distances traversed inside the luminous layer as a function of the position of the detected target with respect to the imaging device devised according to one aspect of the invention.

FIG. 5 represents a cut through the terrestrial atmosphere and highlights the luminous layer responsible for the luminescence of the night sky.

FIG. 5 presents an axis Oz representing the altitude with respect to a point O situated on the surface of the Earth, the point O corresponding to the zero altitude and being situated on a sphere of radius equal to the terrestrial radius and centered on the center of the Earth. A first circular arc denoted 10 corresponding to an altitude of 10 km represents an exemplary altitude for an aircraft. A second circular arc corresponding to an altitude of 80 km represents approximately the lower limit onwards of which the layer responsible for the luminescence of the night sky can form. It constitutes a sphere of radius equal to the terrestrial radius plus the altitude of this layer centered on the center of the Earth. A third circular arc corresponding to an altitude of 90 km represents approximately the upper limit below which the layer responsible for the luminescence of the night sky can form. This limit also constitutes a sphere centered on the center of the Earth.

The point A corresponds to the position of an imaging device 1 based on the utilization of the luminescence of the night sky. It is onboard the aircraft situated for this example at an altitude of 10 km.

A point B corresponds to a first aerial target to be imaged and an angle $\theta 1$ corresponds to the angular deviation between the axis passing through the points A and B and the axis Oz. In this instance, the angular deviation is relatively small; stated otherwise, the target to be imaged B is situated substantially vertically in line with the point A. The distance traversed e1 of the layer responsible for the luminous background is substantially equal to the thickness of the layer, i.e. about 10 km.

A point C corresponds to a second aerial target to be imaged and an angle $\theta 2$ corresponds to a second angular deviation between the axis passing through the points A and C and the axis Oz. In this instance, the second angular deviation $\theta 2$ is much greater than the first angular deviation $\theta 1$. The distance traversed e2 of the layer responsible for the luminous background is much greater than the thickness of the layer. For example, for an angle $\theta 2$ equal to 90°, corresponding to a target at a point D in the vicinity of the same altitude as A, the distance e2 is equal to 65 km. FIG. 5 shows diagrammatically the geometry: for the Earth its radius of curvature of around 6000 km is relatively 60 times larger than the deviation of around 100 km between the Earth's surface and the layer responsible for the luminescence of the night sky. This explains why the figure does not show the ratio 6.5 between e2 and e1.

It will be readily understood that the larger the distance traversed inside the layer responsible for the luminescence of the night sky, the more significant the quantity of molecules responsible for the luminescence exhibiting an emission band centered on a wavelength lying between 1 and 3 micrometers. Thus, the horizontal luminance is 6.5 times stronger than the zenithal luminance.

In this context, a favored application of the invention is an air-air application such as the imaging of an aerial target by the imaging device 1 as described previously, the device 1 being onboard an aircraft.

Figure 6:
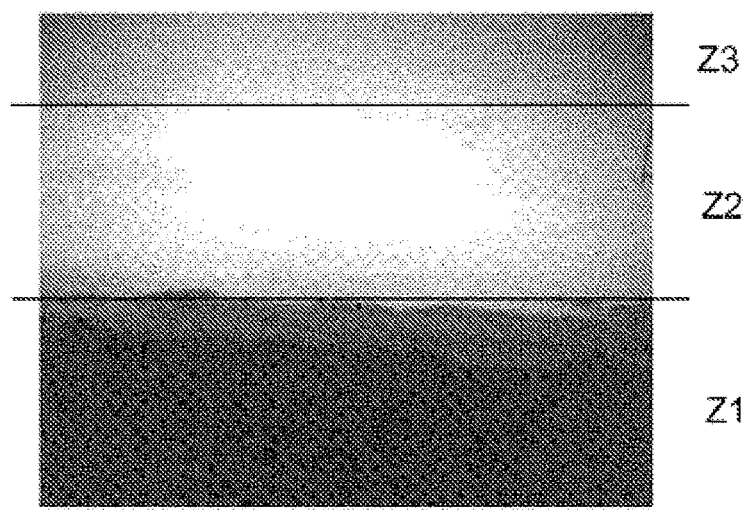
FIG. 6 represents a night sky image obtained on the basis of a device comprising detectors operating in the SWIR region, according to one aspect of the invention.

FIG. 6 represents an image of the night sky recorded with the aid of the imaging device as described previously in altitude.

The imaging device used to achieve this image comprises at least one detector 5 comprising pixels 51 configured to operate in a wavelength region corresponding to the SWIR between 1 and 3 micrometers.

The image obtained is in black and white; it is possible to divide it into three zones: a first zone z1 corresponding to the ground or to the top of the clouds, a second zone z2 corresponding to the horizon and to the angular region immediately above the night sky and a third zone z3 corresponding to the vicinity of the zenithal part of the night sky.

The first zone corresponds to the ground and to the top of the clouds. These latter appear in a very dark manner, on account of the absorption bands of water in this wavelength region.

The second zone z2 is luminous because of the night glow and of the sighting with a significant angle $\theta 2$.

The third zone Z3 corresponds to the zenithal part of the night sky; the luminance there is progressively weaker with $\theta 1$ decreasing progressively.

Let us note that high-altitude clouds of cirrus type, consisting of seeds of ice crystals probably of smaller diameter than the wavelength corresponding to the emission band responsible for the luminance, are mainly diffusing. On the other hand, low-altitude clouds, consisting of water droplets which are absorbent in the SWIR region for a wavelength of greater than 1.4 µm, are mainly absorbent.

Stated otherwise, high-altitude clouds are diffusing and are not detrimental to the observation of the luminescence of the night sky in the SWIR region whereas low-altitude clouds are opaque and dark and prevent the observation of the luminescence of the night sky in the wavelength region above 1.4 µm from the ground or from an altitude below the cloud layers.

In conclusion, the imaging device 1 comprising a detector (5, 11) comprising pixels (51, 111) configured to operate in the SWIR region is particularly suitable for air-air applications, the imaging device 1 being onboard an aircraft deploying above the low-altitude clouds. It should be noted that the nights of levels 5 night with no Moon with a cloud cover of less than 0.7 mlux do not have any relevance for this type of air-air configuration.

The imaging device 1 is also suited to ground-air applications; it allows the detection notably of aerial targets deploying under a clear bright sky. It also allows the detection from the ground of aerial targets deploying at higher altitude if the night sky does not comprise any low-altitude clouds.

The imaging device 1 according to the invention allows the imaging of aerial targets in a night sky. The image of an aerial target obtained is a black and white image. The silhouette of the target is represented black such as a cast shadow on a bright luminous background. The exhaust gases not comprising in the SWIR region any very strong emission bands as in the MWIR region, the image of the target corresponds solely to the silhouette of the target thereby facilitating the angular location and the identification of the aircraft. On account of the wavelength, the resolution is improved by a factor of 3 with respect to an imaging device operating in the MWIR, such as conventional infrared cameras. In cases where the very hot points of the airplane are visible such as the outlets of jets or nozzles, these may give a measurable infrared signature in the SWIR on account of the black body law. These signatures may help to identify the aircraft and to determine its orientation. These signatures will in particular be more significant when the targets are under rear presentation.

The invention claimed is:

1. A method for detecting a target not emitting in the wavelength region lying between 1 µm and 1.9 µm, the target being in a night sky luminous environment of level 4 or less than 4, comprising:
   obtaining an image with an imaging device of focal length f and of pupil diameter D, comprising at least one detector comprising types of pixels configured to operate in the wavelength region lying between 1 µm and 1.9 µm, the detectors exhibiting a noise level of less than $0.6 \times 10^{15}/(f/D)^2$,
   and from the image obtained by the device, extracting at least one negative-contrast zone, being a black zone on a bright background corresponding to the presence of the target in the night sky of level less than or equal to 4.

2. The method for detecting a target as claimed in claim 1, wherein the target is an aircraft part not emitting in the wavelength region lying between 1 µm and 1.9 µm.

3. The method for detecting a target as claimed in claim 1, wherein the imaging device is installed aboard an aircraft in flight, the pupil diameter D lies between 30 mm and 300 mm and the focal length f lies between 300 mm and 3000 mm and in that the imaging device has a field of view <10°, for an air-air application.

4. The method for detecting a target as claimed in claim 1, wherein the imaging device is installed on the ground, the pupil diameter D lies between 10 mm and 100 mm and the focal length f lies between 30 mm and 300 mm and in that the imaging device has a field of view >10° for a ground-air application.

* * * * *